United States Patent [19]

Balog et al.

[11] Patent Number: 4,880,373
[45] Date of Patent: Nov. 14, 1989

[54] TABLET PRESS

[75] Inventors: Stephen Balog, Kalamazoo; Everett N. Hiestand, Galesburg, both of Mich.

[73] Assignee: The Upjohn Company, Kalamazoo, Mich.

[21] Appl. No.: 187,569

[22] Filed: Apr. 28, 1988

[51] Int. Cl.[4] .............................................. B29B 11/12
[52] U.S. Cl. ................................... 425/149; 264/40.5; 425/353; 425/413; 425/442; 425/451.9; 425/453; 425/457
[58] Field of Search ................. 264/40.5; 425/77, 149, 425/150, 352, 353, 354, 405.1, 406, 411, 412, 413, 414, 415, 416, 419, 442, 451, 451.9, 452, 453, 456, 457, 469

[56] References Cited

U.S. PATENT DOCUMENTS

| | | | |
|---|---|---|---|
| 2,038,205 | 4/1936 | Case | 425/442 |
| 2,103,215 | 12/1937 | Cook | 425/354 |
| 3,373,460 | 3/1968 | Ladney, Jr. | 425/416 |
| 3,479,704 | 11/1969 | Reed | 425/452 |
| 3,792,947 | 2/1974 | Diehl | 425/411 |
| 3,794,458 | 2/1974 | Iwasaki | 425/353 |
| 3,868,201 | 2/1975 | Jacobson et al. | 425/406 |
| 3,890,413 | 6/1975 | Peterson | 264/40.5 |
| 3,942,431 | 3/1976 | Goff | 425/150 |
| 4,000,231 | 12/1976 | Peterson | 425/149 |
| 4,731,009 | 3/1988 | Morse | 425/406 |

FOREIGN PATENT DOCUMENTS

| | | | |
|---|---|---|---|
| 246388 | 11/1987 | European Pat. Off. | 425/352 |
| 578291 | 9/1924 | France | 425/442 |

OTHER PUBLICATIONS

"Indices of Tableting Performance", *Powder Technology*, 30,38 (1984) 145-159; by E. N. Hiestand and D. P. Smith.
"Three Indices for Characterizing the Tableting Performance of Materials", *Advances in Ceramics*, vol. 9, pp. 47-57, 1984, by E. N. Hiestand and D. P. Smith.

*Primary Examiner*—Jay H. Woo
*Assistant Examiner*—C. Scott Bushey
*Attorney, Agent, or Firm*—Flynn, Thiel, Boutell & Tanis

[57] ABSTRACT

A press particularly for forming a blocklike tablet or compact from powder. A die is split into opposed halves for defining a die opening vertically therethrough. The die is supported within a carrier having an openable front door. The carrier is mounted on a carriage which is horizontally rollable on a base frame between compacting and loading positions. The carrier preferably has limited resilient floating movement relative to the carriage in the vertical direction. A first pressure cylinder has its housing carried by the carrier so that its piston rod extends horizontally for direct compression against a rear side of the die. A second pressure cylinder has its housing mounted on the frame and its piston rod extending vertically downwardly for compression against a punch which projects downwardly into the die opening to compress the powders therein against a lower punch. The die is vertically aligned with the piston rod of this second cylinder only when the carriage is in the compacting position.

16 Claims, 4 Drawing Sheets

TABLET PRESS

FIELD OF THE INVENTION

This invention relates to an improved press for creating tablets, particularly large blocklike tablets used for testing the parameters which characterize the tableting properties of powders or particulate materials.

BACKGROUND OF THE INVENTION

In the pharmaceutical industry, it is important to know the parameters which characterize the tableting properties of powders which are compressed to form tablets used for human and animal consumption. The bonding index of the powder is probably the most important parameter, and this index is determined from fundamental considerations of specific tablet models in order to determine how the interparticle bonds form. With respect to the experimental tests which are carried out on these models, these typically involve an indentation hardness test wherein a ball is impacted against one face of the model, and a tensile strength determination wherein the model is subjected to transverse compression.

To create the test model or compact, the latter being an enlarged blocklike tablet which has a square cross section approximately 19 mm on a side and a thickness somewhat less than the side dimension, it has been conventional to utilize a press mechanism having a split die assembly into which the powder is positioned, and then subjected to uniaxial compression to form the test tablet. In this known press mechanism, which has been used by the assignee of this application for many years, the die has a die cavity of square cross section, and is split diagonally into two die halves. A first pressure cylinder imposes a compression force on the die halves in a horizontal direction which is perpendicular to the vertical plane which splits the die halves. A second pressing cylinder has a punch thereon of a cross section so as to be vertically insertable into the die cavity and exert a vertical compression force on the powder therein to create the test tablet. The two pressure cylinders are joined to a common pressure source, the latter being a manual pumping arrangement, so that pressure builds up simultaneously in the two cylinders in a controlled but fixed ratio relationship to one another. After the powder has been suitably compacted, the two pressure cylinders are simultaneously depressurized, again in a controlled but fixed ratio relationship to one another, through a suitable dump valve which permits the pressure fluid to flow back to the reservoir. This effectively results in what is known as "triaxial decompression" of the test tablet, following the uniaxial compression thereof. This triaxial decompression is necessary so that the resulting test tablet is free of fracture lines and is suitable for tensile strength testing.

In this known press mechanism, a stationary punch is positioned at the lower end of the die cavity in opposed relationship to the movable punch. This lower punch, in selected situations, has a retractable spring-urged pin projecting upwardly therefrom for forming an axial orientation hole through the center of the compact.

This press mechanism is utilized for creating compacts for both tensile strength testing and impact testing.

While this known press mechanism has provided suitable test compacts for a number of years, nevertheless there has been a continuing desire to improve the manner in which the test compacts are formed so as to permit more accurate evaluation of the bonding properties of the material, particularly by measurement of the impact and tensile strength. There has been a desire to improve not only the ease and efficiency of making the test compacts, but also the ability to significantly increase the uniformity of the properties of the compacts so that the compact will be free of fracture lines and other undesired irregularities and nonuniformities which can influence or effect the test measurements which subsequently result from the impact and tensile strength tests.

Accordingly, it is an object of this invention to provide an improved press for creating enlarged blocklike tablets or compacts from a powdered material, which press significantly improves upon the performance characteristics of the known press described above.

More specifically, in the improved press of this invention, the press has an improved split die assembly which can be readily opened and closed and, in cooperation with the bottom punch, greatly facilitates both the loading of powder into the die assembly and the removal of the formed compact therefrom. The improved press also incorporates structure, specifically a horizontally shiftable carriage mechanism which mounts the die assembly thereon, so that the die assembly can be readily horizontally moved between a loading and unloading position wherein it is spaced sidewardly a substantial distance from the pressing region so as to greatly increase convenience of access thereto, and a pressing position wherein the die assembly is aligned with the pressing cylinder to permit exertion of a pressing force on the powder within the die assembly to create the compact.

The press also has an improved pressing mechanism which, while it again includes two perpendicularly oriented pressing cylinders cooperating with the die assembly, also has selectable and independent contols which permit precise and independent regulation of the pressure in each of the cylinders in a coordinated manner both during compression and during decompression particularly for permitting precise and adjustable control over the individual pressures in the two cylinders during the critical triaxial decompression stage to hence adjustably control the relationship between these pressures.

Other objects and purposes of the invention will be apparent to persons familiar with presses of this general type upon reading the following specification and inspecting the accompanying drawings.

Figure 1:
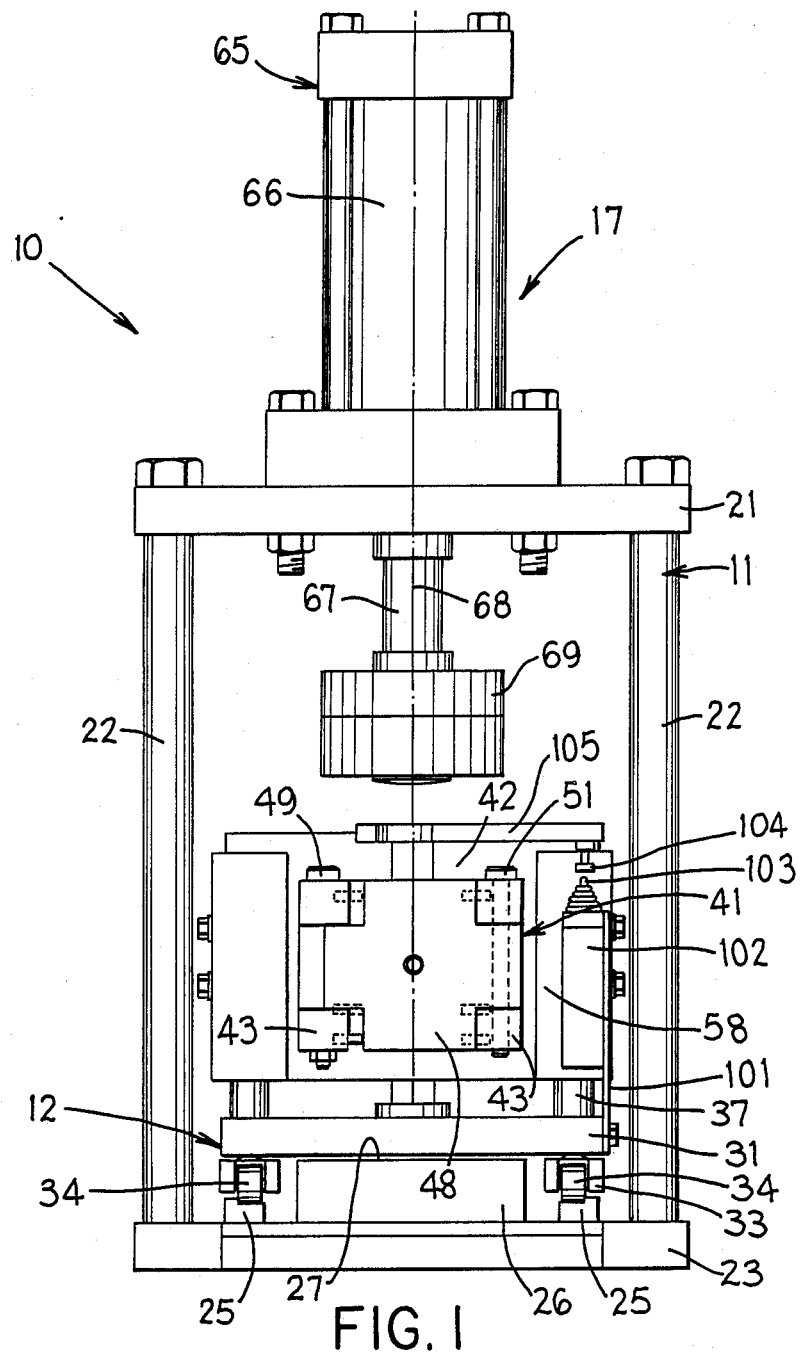
FIG. 1 is a front elevational view of the press according to this invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the press and designated parts thereof. Said terminology will include the words specifically mentioned, derivatives thereof, and words of similar import.

DETAILED DESCRIPTION

Figure 3:
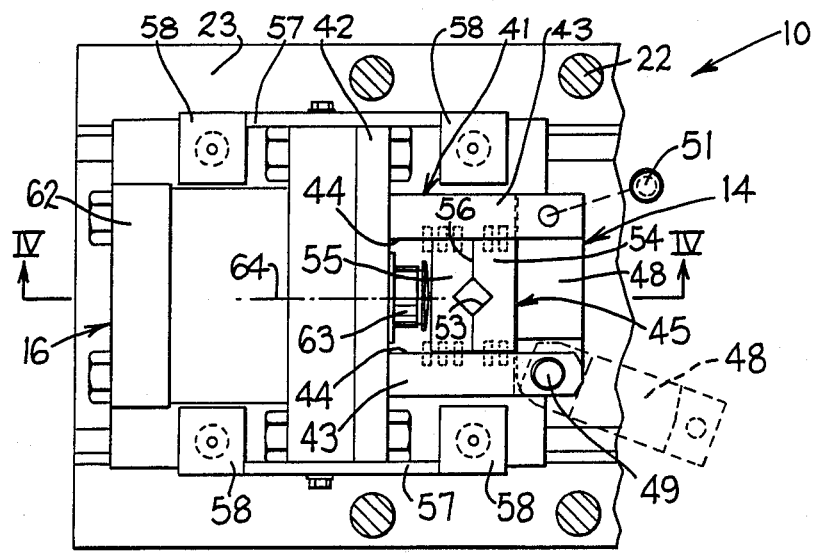
FIG. 3 is a fragmentary top view of FIG. 2.
Figure 2:
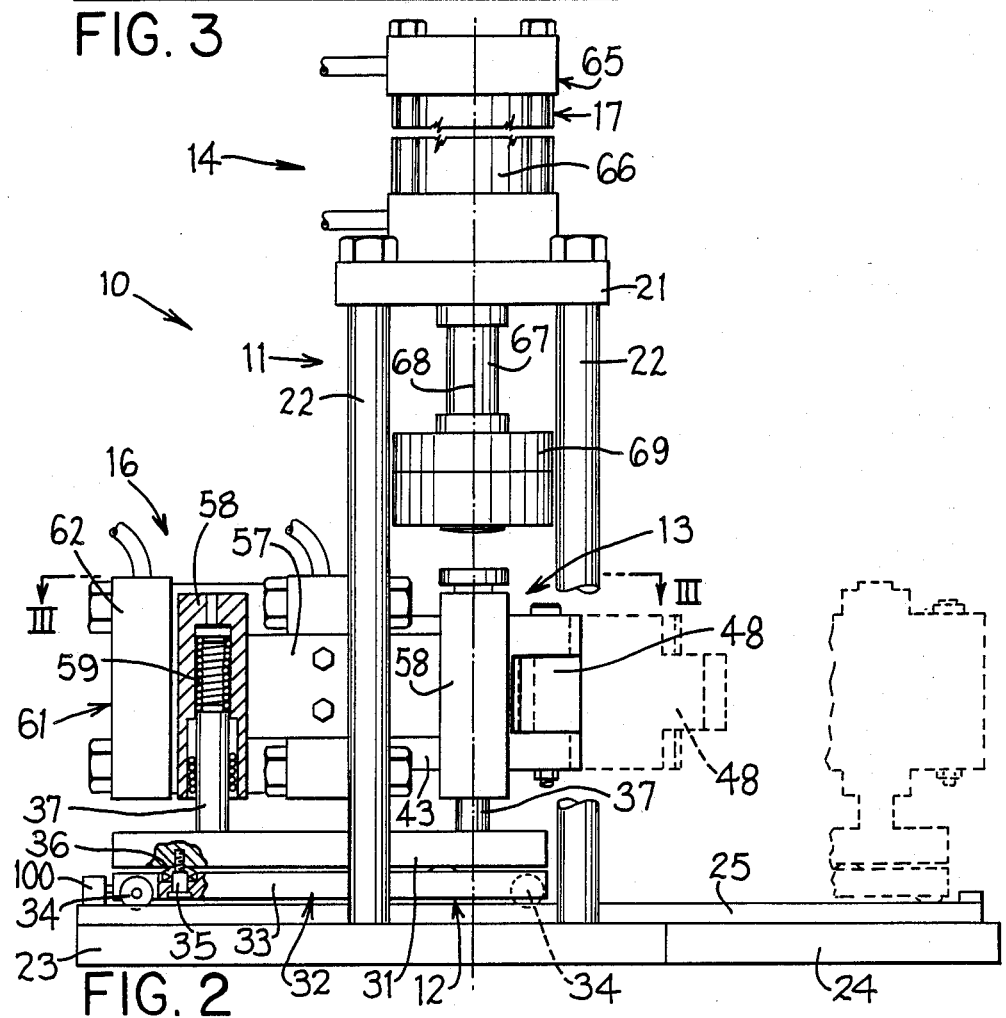
FIG. 2 is a side elevational view thereof.
Figure 4:
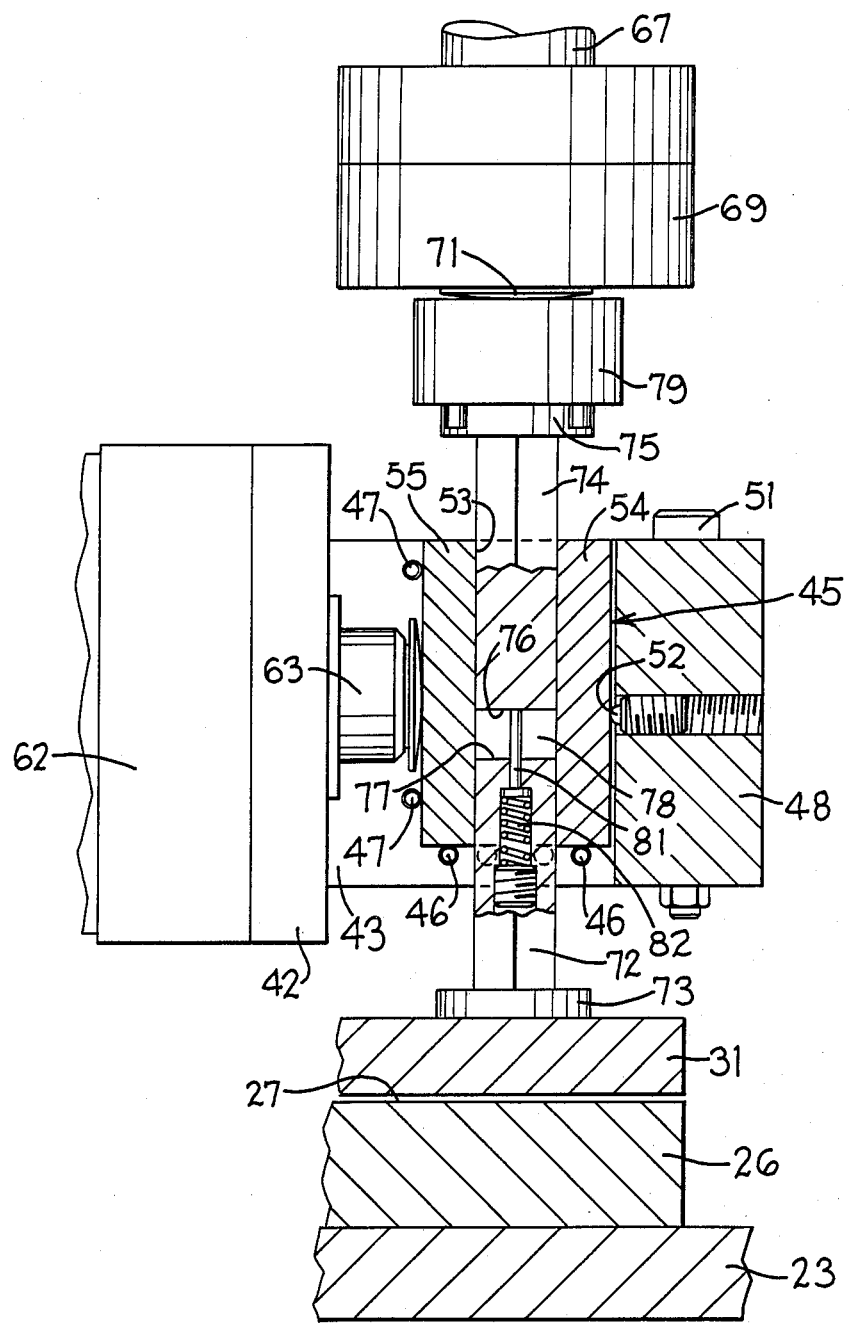
FIG. 4 is an enlarged, fragmentary sectional view of the die assembly.

FIGS. 1–3 illustrate therein a press apparatus 10 according to the present invention for forming a blocklike tablet or compact from a powder material. This press apparatus 10 includes a frame 11 on which a carriage 12 is supported for horizontal rolling movement between operational and nonoperational positions, these positions being respectively illustrated by solid and dotted lines in FIG. 2. The carriage assembly 12 carries thereon a die assembly 13, and a pressing mechanism 14 cooperates with the die assembly to compress the powder into a blocklike compact. The pressing mechanism includes a first or side pressing mechanism 16, and a second or top pressing mechanism 17. These mechanisms 16 and 17 respectively exert pressing forces in horizontal and vertical directions.

The frame 11 includes a generally horizontally extending top plate 21 which is secured through a plurality (here four) of vertically extending posts 22 to a generally horizontally extending base plate 23. The latter has a front part 24 which extends significantly forwardly from beneath the top plate 21. The base plate 23 has a pair of sidewardly spaced parallel tracks 25 secured to the upper surface thereof, which tracks have a generally L-shaped cross section. A bearing plate 26 is fixedly secured to the base plate 23 and is disposed between the tracks 25. Bearing plate 26 is disposed at least within the area of the frame defined within the support posts 22, and defines thereon a generally horizontally planar upper surface 27.

The carriage 12 is rollingly supported on the tracks 25 so as to be horizontally linearly displaceable back and forth between an operative or pressing position as illustrated by solid lines in FIG. 2 and an inoperative position wherein the carriage is disposed forwardly on the front extension plate 24, as fragmentarily illustrated by dotted lines in FIG. 2.

The carriage 12 includes a generally horizontally extending support plate 31 which has a pair of roller assemblies 32 mounted under the side edges thereof for engagement with the respective tracks 25. Each of these roller assemblies 32 includes an elongated support rail 33 having a pair of rollers 34 mounted adjacent opposite ends thereof, the latter rollers being directly rollingly engaged with a respective one of the tracks 25. The roller assemblies 32 are spring-urged downwardly relative to the support plate 31, and for this purpose each support rail 33 has a pair of headed pins 35 which slidably project upwardly through the support rail 33 adjacent opposite ends thereof for fixed securement to the support plate 31. Springs 36, such as washer or plate-type springs, surround each pin 35 and coact directly between the support plate 31 and the respective support rail 33 for urging the latter downwardly into abutting engagement with the headed end of the respective pin 35. The support plate 31 of the carriage is thus normally maintained in a slightly raised position whereby the undersurface of plate 31 is spaced slightly above the upper surface 27 of the bearing plate 26.

The die assembly 13 includes a die carrier 41 mounted on the carriage 12 for linear back-and-forth movement therewith. This die carrier 41 is generally U-shaped in plan view and includes a back plate 42 which extends generally perpendicularly with respect to the tracks 25 and has a pair of generally parallel side plates 43 fixed thereto and projecting forwardly therefrom in generally cantilevered relationship. These side plates 43 have generally parallel and opposed inner side surfaces 44 for accommodating a die 45 therebetween.

The die 45 is vertically supported on a plurality of support elements, specifically pins 46, which are fixed to the side plates 43 and project inwardly therefrom for engagement with the bottom surface of the die. Additional pins 47 are also fixed to and project inwardly from the opposed side plates 43, with these latter pins 47 being adapted to abut the rear surface of the die 45 and hence limit the inward positioning of the die between the side plates.

The die carrier 41 also includes a door 48 which is transversely coupled between the forward ends of the side plates 43 for confining the die 45 therebetween. This door 48 is of a generally cross-shaped configuration when viewed from the front (FIG. 1). One horizontally extending arm of this door 48 forms a knucklelike hinge with one side plate 43, this hinge being created by a suitable hinge pin 49 extending vertically therethrough. The other horizontally extending arm of the front door 48 extends into a suitable recess formed vertically intermediate the upper and lower edges of the other side plate 43, and a removable headed locking pin 51 is slidably inserted through aligned openings formed in the side plate and door to hold the door in a closed position wherein the rear or inside surface of the door extends perpendicularly between the inner side surfaces 44. However, by manually removing the locking pin 51, the door 48 can be hingedly swung about the hinge pin 49 into an open position substantially as indicated by dotted lines in FIGS. 2 and 3 to hence provide front access into the region between the side plates 43. The door 48 has a spring-urged pin or ball 52 mounted thereon so as to project outwardly beyond the inner surface thereof, which spring-urged ball or pin 52 is designed to coact with the front surface of the die 45 and hence hold the latter against the rear stop pins 47 when the door is closed.

Considering now the die 45, it has a generally rectangular (and preferably a square) horizontal cross section, and has an elongated opening or chamber 53 extending vertically therethrough. The die 45 is defined by substantially identical die halves which are hereinafter referred to as the front and rear die halves 54 and 55, respectively. These identical front and rear die halves 54 and 55 are also mirror images of one another about a vertical plane 56 which splits the die into the two halves.

The die opening or chamber 53 is preferably of a square cross section when viewed in a horizontal plane, and the square cross section of the die opening 53 is horizontally angularly offset by an angle of 45° relative to the square cross-sectional outer profile of the die. The vertical splitting plane 56 thus extends diagonally across the square profile of the die opening 53.

The first or side pressure mechanism 16 includes a conventional double-acting fluid pressure cylinder 61 which has the housing 62 thereof fixedly attached to the rear plate 42 of the die carrier 41. The cylinder 61 has a piston rod 63 thereof projecting forwardly for movement along an axis 64 which extends horizontally generally parallel with the direction of movement of the carriage 12. This piston rod 63 slidably projects through the rear plate 42 so that the free end of the piston rod 63 is disposed closely adjacent the rear surface of the die 45. In fact, the piston rod axis 64 is oriented so that it generally horizontally intersects the vertical axis or centerline of the die cavity 53.

To support the die carrier 41 on the carriage 12, the die assembly 13 includes a pair of generally H-shaped yokes, as viewed from the side (FIG. 2), fixedly secured to opposite sides of the pressure cylinder 61. Each of these H-shaped yokes includes a generally center support bar 57 which is fixedly secured to the cylinder housing 62, and this center support bar 57 in turn has a pair of upright support columns 58 fixedly secured adjacent the front and rear edges thereof. Each of these latter columns 58 has a downwardly opening bore therein into which slidably projects one of the support rods 37 which projects upwardly from the carriage support plate 31. A suitable compression spring 59 is confined within the bore of each support column 58, and reacts against the upper end of the respective support rod 37, whereby the complete die carrier 41 and the cylinder 61 are vertically resiliently mounted on the carriage 12 so as to have limited vertical displacement relative thereto as permitted by the springs The second or top pressing mechanism also includes a conventional double-acting fluid pressure cylinder 65 having its housing 66 mounted on the top plate 21 so that the reciprocal piston rod 67 projects vertically downwardly along a generally vertically extending central axis 68, the latter being approximately vertically aligned with the central vertical axis of the die cavity 53. The piston rod 67 has at its lower end a conventional force transducer 69, the latter on its lower side being provided with a rounded head plate 71 adapted for force application against an external member. The force or load transducer 69 is a conventional and well known commercial item which measures compressive force, and hence the description of such item is believed unnecessary.

To permit confinement and compression of powder within the die opening 53, a first (i.e., a lower) punch 72 is disposed so as to slidably project upwardly into the lower portion of the die opening 53. This lower punch 72 has a generally square cross section corresponding to the cross section of the opening 53 so that the punch is closely yet slidably vertically displaceable relative to the die. This lower punch 72 has an enlarged foot 73 at the lower end thereof which enables it to freely rest on the upper surface of the carriage support plate 31.

A similar upper punch 74 slidably projects downwardly into the upper end of the die cavity 53. This punch 74 has the same cross section as the lower punch so as to be snugly yet vertically slidably displaceable relative to the die. The upper punch 74 also preferably has an enlarged head plate 75 at the upper end thereof to permit application of pressing force thereto. While this head plate 75 can be directly engaged with the end 71 of the top pressing mechanism, nevertheless it is preferred to utilize an intermediate cylindrical spacer 79 therebetween. This latter spacer is seated on the punch head 75, and the spacer in turn has the upper surface thereof disposed for pressing engagement with the piston rod head 71. Spacer 79 is preferably one of a plurality of spacers all of slightly different heights so as to permit the press apparatus to create compacts having different thicknesses without having to change any of the other parameters or settings of the apparatus.

When the punches 72 and 74 are slidably inserted into opposite ends of the die opening, this results in the opposed end faces 76 and 77 on the punches cooperating with the surrounding wall of the die so as to create a die cavity 78 which is of generally square cross section.

The lower punch 72 additionally may have a headed pin 81 slidably supported thereon and urged upwardly by a spring 82 so that the pin projects upwardly a significant extent beyond the upper surface 77. This pin 81 vertically spans the die cavity 78 along the central vertical axis thereof so as to permit creation of a small hole through the compact.

Figure 5:
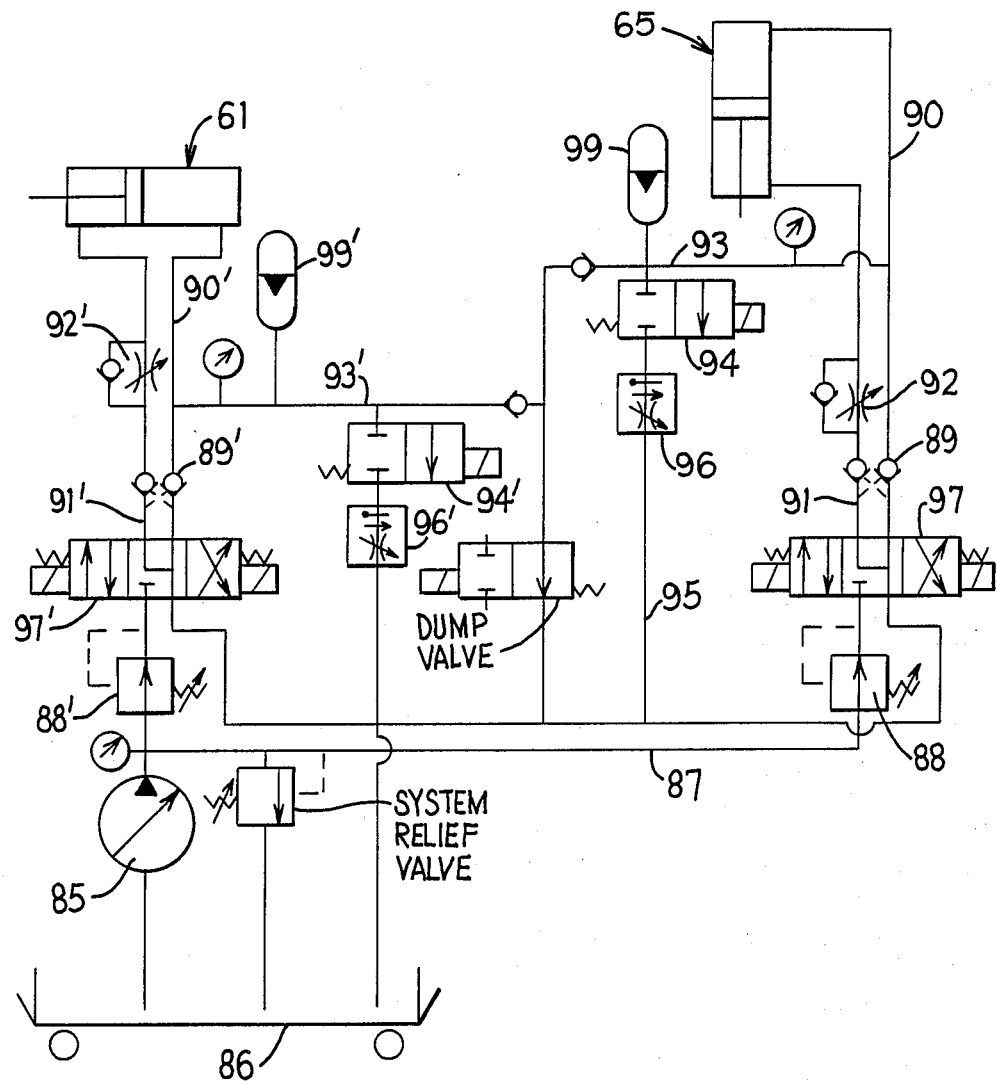
FIG. 5 diagrammatically illustrates the control arrangement for the pressing cylinders.

To control the pressure cylinders 61 and 65, and referring to FIG. 5, pressure fluid is supplied by a pump 85 from a tank or reservoir 86 to a first conduit 87 through a pressure-reducing valve 88 and a one-way check valve 89 into a conduit 90 which couples to the upper end of the cylinder 65 (the punch cylinder) to hence cause downward extension of its piston rod. During this downward extension, fluid in the lower chamber of cylinder 65 is discharged through conduit 91, and through an adjustable flow restricting device 92 therein, back to the tank 86. The pressurized fluid in lines 87 and 90 also flows into a branch line 93 which has a conventional pressure accumulator 99 (such as a bladder type accumulator) connected thereto. This branch line 93 couples through a normally closed control valve 94 to a further conduit 95 which feeds back to the reservoir, this conduit 95 having a precision adjustable flow restricting device 96 associated therewith. The control valve 94 is normally maintained in a closed position, as by a spring, during pressurization of the upper chamber of the punch cylinder 65.

The pressurization of the upper chamber of punch cylinder 65 continues so as to effect compression of the powders between the upper and lower dies 72 and 74. Upon reaching a predetermined vertical thickness or compression force as measured by the load cell 69, however, then the predetermined value measured by the load cell acting through appropriate electrical control circuitry (such as a computer program or the like) allows a shut down of the pump 85 and an energization of the solenoid associated with the valve 94 so as to shift the valve 94 into its open position. This hence permits a controlled depressurization of the upper chamber of the punch cylinder 65 as permitted by the open valve 94 and the serially related flow restrictor 96. The adjustable flow restrictor 96, which is controllable either manually or electronically by appropriate electrical circuitry or computer programming, provides precise control over flow therethrough back to the reservoir 86, and hence permits the pressure in the upper chamber of cylinder 65 to gradually decrease. More specifically, the pressure in the upper chamber of punch cylinder 65 is permitted to decrease, preferably linearly, to about zero, while at the same time this pressure decrease in the upper chamber occurs without causing any significant movement of the associated piston. The presence of the accumulator 99 as associated with the line 93 hence permits a very precise and controlled bleed down of pressure without resulting in any movement of the piston associated with the punch cylinder 65. In this manner, the compressive forces imposed on the compact in the vertical direction can hence be relieved in a precisely controlled manner.

The fluid circuitry and hence the control of pressure fluid both to and away from the outer chamber of the die clamp cylinder 61 is substantially identical to the fluid circuitry for the punch cylinder 65 and, in fact, is connected to the same pump 85 for controlling flow of pressure fluid. Hence, the circuitry and specifically the flow control components associated with pressure fluid supplied to and from the outer chamber of die clamp cylinder 61 have been designated by the same reference numerals but with the addition of a prime (') thereto. Due to the presence of the adjustable flow control device 96' located downstream of the normally-closed flow control valve 94', the decompression of the outer chamber of die clamp cylinder 61 can be precisely controlled in the same manner as, but independent of, the decompression of the upper chamber of punch cylinder 65. This hence enables the complete three-dimensional decompression of the compact to be precisely controlled.

After the compact has been triaxially decompressed as explained above, then the pump 85 is again energized and the control valves 97 and 97' are shifted so as to permit pressure fluid to be supplied to conduits 91 and 91' so that the cylinders 61 and 65 are reversely pressurized to cause them to be retracted, following which the die assembly can then be moved outwardly and opened so as to permit removable of the compact.

The carriage assembly carries a displacement transducer 102 attached to bracket 101 which is attached to support plate 31. The probe 103 of the displacement transducer extends upwardly to be in position to be acted upon by the head of downwardly extending adjusting screw 104, which screw is mounted an arm 105. This arm 105 extends outwardly from the punch 74. The displacement transducer provides output to register the spacing between the opposed punch surfaces 76 and 77. Items 101–105 are omitted from all figures except FIG. 1 to avoid masking other structural parts of the die assembly.

OPERATION

Operation of the press apparatus will be briefly described to ensure a thorough understanding thereof.

To load the press, the carriage 12 is manually rolled forwardly into the inoperative position indicated by dotted lines in FIG. 2. The lock pin 51 is vertically removed so that the door 48 can be swung open into the dotted position illustrated by FIG. 3. If a die 45 is present, it can then be manually removed forwardly, carrying with it the upper and lower punches. The upper punch 74 is manually removed and the die halves 54–55 separated to permit removal of the blocklike compact formed from compressed powder.

The split die is then reassembled and the lower punch 72 positioned within the die opening 53, and the die inserted between the side plates 43 so that the die abuts the rear stop pins 47 and rests on the lower stop pins 46. Door 48 is then closed and the lock pin 51 reinserted to lock the door in its closed position. The resilient urging of the pin or ball 52 maintains the die halves 54 and 55 in engagement with one another. A predetermined or measured quantity of powder is deposited into the upper end of the die opening, and then the upper punch 74 is inserted into the die opening above the powder. The carriage 12 is then returned to its operational position as indicated by solid lines in FIG. 2 wherein the die is located beneath the vertical pressure cylinder 65.

When the carriage 12 reaches its rearwardmost position, it contacts a limit switch 100 which indicates that the carriage is properly positioned and permits activation of the circuitry controlling the pressure cylinders.

With the main control valves 97 and 97' shifted leftwardly from the positions shown in FIG. 5, then this allows pressure fluid as supplied by the pump 85 to be supplied through conduits 90 and 90' to the punch and clamp cylinders 65 and 61 respectively. The clamp cylinder 61 hence exerts a closing force against the die to hold the two die halves tightly together against the door 48, and then the punch cylinder 65 moves its piston rod downwardly so as to press against the top punch 74 to effect compaction of the powder into a compact. When a predetermined vertical compaction force is sensed by the load cell 69, however, then the control valves 94 and 94' are shifted into their open positions so as to permit triaxial decompression of the compact. This triaxial decompression is controlled by means of the flow control devices 96 and 96', which devices permit controlled depressurization of the cylinders 61 and 65 without permitting any movement of the respective pistons. Further, the decompression in the horizontal and vertical directions can be individually controlled in relationship to one another by individual adjustment of the control devices 96 or 96'.

After the cylinders have been depressurized, then the control valves 97 and 97' are actuated (i.e., shifted rightly from the positions shown in FIG. 5), along with the pump 85, to supply pressure fluid through conduits 91 and 91' to opposite ends of the cylinders 61 and 65 so as to move these cylinders respectively into their outer and upper positions. The carriage 12 can then be manually rolled to its outer position, the door 48 opened, and the die removed so as to effect removal of the compact.

During the compressions of the powder due to the downward force applied by the top pressure cylinder 65, this force is transferred from the top punch 74 through the compact to the lower punch 72, and thence onto the carriage support plate 31. This causes the carriage support plate 31 to move downwardly due to compression of the springs 36 so as to seat against the upper surface 27 of the bearing plate 26, whereby the compression forces are transmitted directly to the base plate of the frame. This enables precise control over the downward compression force, and hence permits precise measurement of the vertical compression force being imposed on the compact.

At the same time, the complete die carrier 41 (including the die 45) and its pressure cylinder 61 is unitarily mounted so as to vertically resiliently float relative to the carriage support plate 31 due to the cooperation between the posts 37 and the support columns 58, and hence die carrier 41 and the die 45 carried thereby can itself readily vertically float so as to not be affected by the vertical carriage movement, and at the same time not impose any undesired vertical forces on the compact due to this free vertical floatability.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a press for forming a blocklike compact from powder, said press including a removable die which is vertically split into two halves which define therebetween a die opening which extends vertically through the die, removable upper and lower punches projecting into opposite ends of the die opening for defining a die cavity therebetween for creating the compact, a first fluid pressure cylinder means coacting with the die for applying a substantially horizontally directed force thereto tending to maintain the opposed die halves in closed engagement with one another, and a second fluid pressure cylinder means for applying a vertically directed compression force against one of said punches to effect compaction of the powder within the die cavity to create the blocklike compact, the improvement comprising:

a frame;

carriage means movably supported on said frame for horizontal displacement between first and second positions which are significantly horizontally displaced from one another;

die carrier means mounted on said carriage means and movable therewith between said first and second positions, said die carrier means including opposed side supports for confining the die therebetween, and a rear support for abutting contact with one side of said die, said die carrier means also including a front support which is movable relative to said side supports between open and closed positions for providing access to the region defined between said side supports, said front support when in the closed position cooperating with a front side of the die for confining the die between the front and rear supports and between the opposed side supports;

said first cylinder means having a housing which is stationarily fixed relative to said side supports and having a linearly extendable piston rod which projects substantially horizontally between said side supports for abutting contact with a rear side of said die;

said second cylinder means having a housing which is fixed relative to said frame and a piston rod which is linearly movable along a generally vertical axis which is fixed relative to said frame for applying a vertical compression force against said one punch;

said die when mounted on said die carrier means being disposed with the die opening substantially vertically aligned with the vertical axis of said second cylinder means when the carrier means is in said first position, said die being horizontally displaced from said vertical axis when said carriage means is in said second position;

said carriage means including a carriage member which removably mounts said other punch thereon, and spring-urged rollers carried by said carriage member for rolling engagement with said frame to permit movement between said first and second positions, whereby application of force by said second cylinder means to the compact formed by said die is transmitted vertically from said carriage means directly to said frame due to retraction of the rollers relative to the carriage member so that a part of the carriage member directly vertically abuts a part of the frame to permit direct vertical force transfer therebetween; and resilient support means connected between said carriage means and said die carrier means for permitting vertical floating movement of said die carrier means and said first cylinder means relative to said carriage means.

2. A press according to claim 1, wherein said front support is hingedly connected along one vertical edge thereof to one said side support for horizontal swinging movement about a vertical hinge axis between open and closed positions, and movable lock means coacting between the other side support and the other vertical edge of said front support when in said closed position for positively holding the front support in said closed position.

3. A press according to claim 1, including first adjustable restriction means for selectively controlling and adjusting the rate of discharge of pressure fluid from said first cylinder means when the respective piston rod thereof is moving away from the die, and second adjustable restriction means for selectively controlling and adjusting the rate of discharge of pressure fluid from the second pressure cylinder means when the respective piston rod thereof is moving away from the die, said first and second adjustable restriction means being adjustable independently of one another.

4. A press according to claim 1, including control means for permitting simultaneous but individually controlled horizontal and vertical decompression of said blocklike compact to achieve triaxial decompression thereof, said control means including first means for adjustably controlling rate of discharge of pressure from said first cylinder means to individually control horizontal decompression of the compact, and second means for selectively and adjustably controlling rate of discharge of pressure from the second cylinder means to individually control vertical decompression of the compact, said first and second means respectively permitting the horizontal and vertical decompression of the compact to be controlled independently of one another.

5. In a press for forming a blocklike compact from powder, said press including a removable die which is vertically split into two die halves and which define therebetween a die opening which extends vertically through the die, removable upper and lower punches slidably projecting into opposite ends of the die opening for defining a die cavity therebetween for creating the blocklike compact, a first fluid pressure cylinder means coacting with the die for applying a substantially horizontally directed force thereto to maintain the opposed die halves in closed engagement with one another, and a second fluid pressure cylinder means for applying a substantially vertically directed compression force against one of said punches to effect compaction of the powder within the die cavity to create the blocklike compact, the improvement comprising:

a frame;

carriage means movably supported on said frame for horizontal displacement between first and second positions which are significantly horizontally displaced from one another;

die carrier means mounted on said carriage means and horizontally movable therewith between said first and second positions, said die carrier means including opposed side supports for closely confining the die therebetween, the die being oriented so that the vertical split extends substantially perpendicularly between the opposed side supports; and said die carrier means also including a rear support for abutting contact with a rear side of one said die half and a front support which is movable relative to said side supports between open and closed positions for providing access to the region defined between said side supports, said front support when in the closed position cooperating with a front side of the other die half;

said first cylinder means having a housing which is stationarily fixed relative to said side supports and having a linearly extendable piston rod means which projects substantially horizontally between said side supports for abutting contact with the rear side of said die;

said second cylinder means having a housing which is fixed relative to the frame and a piston rod means which is linearly movable along a generally vertical axis which is fixed relative to the frame and is vertically aligned with the die opening when the die and carriage means are in said first position for applying a vertical compression force against said one punch;

control means for individually and independently controlling decompression of said first and second cylinder means to individually and independently control both the horizontal and vertical decompression of the compact after formation thereof, said control means including first means for selectively and adjustably controlling the depressurization of said first cylinder means after the piston rod means thereof has been moved into a position for forming said compact and second means for selectively and individually controlling the depressurization of said second cylinder means after the piston rod means thereof has been moved into a position for forming said compact, each of said first and second means being selectively adjustable independently of one another.

6. A press according to claim 5, wherein said front support is vertically hingedly connected along one vertical edge thereof to one said side support for horizontal swinging movement between said open and closed positions, and lock means cooperating with said front support when in said closed position for positively holding the front support in a locked relation relative to the side supports.

7. A press according to claim 5, wherein said first and second means respectively include first and second adjustable means which are adjustable independently of one another, and said first and second means also respectively including first and second fluid pressure accumulators respectively connected in fluid communication between the respective cylinder means and the respective adjustable means.

8. A press according to claim 5, wherein the lower punch is removably supported on said carriage means and projects upwardly therefrom into the lower end of said die opening, said upper punch projecting upwardly out of said die opening, said second cylinder means being disposed upwardly above said die and having the respective piston rod means thereof projecting downwardly for applying a vertical force to the upper end of said upper punch, and the piston rod means of said second cylinder means having load cell means associated therewith for sensing the vertical compaction force imposed by said second cylinder means on said upper punch.

9. A press according to claim 8, including a set of spacers of differing vertical heights, a selected one of said spacers being removably axially interposed between said upper punch and the piston rod means of said second cylinder means so as to selectively control the vertical thickness of the compact being formed.

10. A press according to claim 5, wherein said frame includes an upwardly-facing base plate which is horizontally enlarged and mounts thereon horizontally elongated rail means extending between said first and second positions, said carriage means mounting thereon rollers which are rollingly engaged with said rail means for movement of said carriage means between said first and second positions, said rollers being spring mounted on said carriage means so as to normally project vertically downwardly of said carriage means for engagement with said rail means, said rollers being vertically contractible relative to said carriage means in response to downward vertical loading of said carriage means so that the carriage means directly vertically engages the base plate to permit direct vertical force transfer therebetween.

11. A press according to claim 5, wherein said front support has spring-urged projection means mounted thereon and projecting outwardly from an inner surface thereof for engagement with the front side of said other die half so as to urge said die halves together when said front support is in said closed position.

12. A press according to claim 11, wherein said rear support is defined by small diameter pins which are fixed to and project in cantilever fashion from said side supports for engagement with the rear side of said one die half, and said side supports also having additional small diameter pins projecting in cantilevered fashion therefrom for supportingly engaging the lower ends of said die halves to vertically support said die on said die carrier means, the region between said side supports other than said small pins being open to facilitate cleaning.

13. A press for forming a blocklike compact from powder, comprising:

a frame defining thereon a horizontally enlarged base plate having horizontally enlarged front and rear plate portions;

said frame including a plurality of upright supports fixed to and projecting upwardly from the rear plate portion, and a top plate fixed to said supports adjacent the upper ends thereof;

horizontally elongated rail means fixedly associated with said base plate and extending horizontally along and between said front and rear plate portions;

carriage means supported for horizontal displacement along said rail means between a first position wherein the carriage means is disposed over the rear plate portion substantially between said upright supports and a second position wherein the carriage means is disposed over the front plate portion;

a die carrier means mounted on said carriage means for horizontal movement therewith between said first and second positions;

said die carrier means including upright wall means defining a generally upwardly-opening die-receiving cavity of generally rectangular cross section;

a die removably positionable within the cavity of said die carrier means, said die being of generally rectangular outer cross section and having a die opening extending vertically therethrough, said die being vertically split into first and second halves for defining the die opening therebetween;

said upright wall means including a pair of generally upright side supports which sidewardly confine the die therebetween, a rear support for abuttingly contacting a rear side of the first die half, and a front support adapted for engagement with a front side of the second die half, the front support being supported along one vertical edge thereof to one of the adjacent side supports by a vertically-extending hinge so that the front support can be horizontally swingably moved between the closed position wherein it cooperates with the die for confining the die within the die carrier means and an open position so as to provide horizontal access to the die;

resilient support means cooperating between said carriage means and said die carrier means for permitting vertical floating movement of said die carrier means relative to said carriage means;

upper and lower punches removably projecting into the respective upper and lower ends of the die opening for defining a die cavity therebetween for creating the block-like compact, said lower punch having a lower end thereof removably supported on said carriage means, said upper punch projecting upwardly out of said die opening;

vertically-acting fluid pressure cylinder means having a housing stationarily fixed to said top plate and a linearly extending piston rod which projects downwardly between said upright supports and is movable along a generally vertical axis which is substantially aligned with the die opening when the die is mounted on the die carrier means and the carriage means is in said first position, said piston rod being adapted to impose a downward vertical force against an upper end of said upper punch; and horizontally-acting fluid pressure cylinder means having a housing which is fixed relative to the side supports and which projects rearwardly of said frame, said horizontally-acting cylinder means having a linearly extending piston rod which projects substantially horizontally forwardly of said frame for abutting engagement with the rear side of said first die half.

14. A press according to claim 13, including control means associated with said horizontally and vertically acting cylinder means for controlling the depressurization thereof after the piston rods thereof have been moved into a position for forming said compact, said control means including an adjustable control device associated with at least one of said cylinder means for adjusting the depressurization rate thereof relative to the depressurization rate of the other cylinder means.

15. A press according to claim 14, wherein said carriage means includes a horizontally enlarged plate-like carriage member positioned closely adjacent but over said base plate, said carriage member having spring-urged rollers mounted thereon and disposed in rolling engagement with said rail means, said rollers being normally spring-urged downwardly from said carriage member but being retractable upwardly into the carriage member when downward force is imposed against the carriage member so that the carriage member directly bears against the base plate, and said resilient support means including a plurality of upright supporting members which have opposite ends thereof connected to the die carrier means and the carriage member, each of said upright supporting members including an upright support rod which is vertically slidably telescoped into an upright support tube, and a spring means coacting between the support rod and support tube for normally maintaining the die carrier means in a raised position relative to the carriage member.

16. A press according to claim 15, including first and second individually adjustable flow control means associated with the respective vertical and horizontal cylinder means for individually and adjustably controlling the horizontal and vertical decompression of the respective cylinder means to provide controlled triaxial decompression of the compact.

* * * * *